US011313438B2

(12) United States Patent
Spruce

(10) Patent No.: US 11,313,438 B2
(45) Date of Patent: Apr. 26, 2022

(54) TURBOFAN GAS TURBINE ENGINE WITH GEARBOX

(71) Applicant: Rolls-Royce plc, London (GB)

(72) Inventor: Mark Spruce, Derby (GB)

(73) Assignee: Rolls-Royce plc

( * ) Notice: Subject to any disclaimer, the term of this patent is extended or adjusted under 35 U.S.C. 154(b) by 300 days.

(21) Appl. No.: 16/515,733

(22) Filed: Jul. 18, 2019

(65) Prior Publication Data

US 2021/0017911 A1 Jan. 21, 2021

(51) Int. Cl.
| | | |
|---|---|---|
| F16H 1/02 | (2006.01) | |
| F02C 7/36 | (2006.01) | |
| F02K 3/06 | (2006.01) | |
| F16H 55/17 | (2006.01) | |
| F16H 55/08 | (2006.01) | |
| F16H 1/06 | (2006.01) | |

(52) U.S. Cl.
CPC ............... *F16H 1/02* (2013.01); *F02C 7/36* (2013.01); *F02K 3/06* (2013.01); *F16H 1/06* (2013.01); *F16H 55/08* (2013.01); *F16H 55/17* (2013.01); *F05D 2220/323* (2013.01); *F05D 2220/36* (2013.01); *F05D 2260/40311* (2013.01)

(58) Field of Classification Search
CPC ..... F05D 2260/40311; F02C 7/36; F02K 3/06
See application file for complete search history.

(56) References Cited

U.S. PATENT DOCUMENTS

| | | | | |
|---|---|---|---|---|
| 4,699,021 | A | * 10/1987 | Waddington | B62D 11/10 180/6.44 |
| 4,815,273 | A | * 3/1989 | Rudolph | F02C 3/067 60/792 |
| 10,113,482 | B2 * | 10/2018 | Poulin | F16H 3/54 |
| 10,605,351 | B2 * | 3/2020 | Sheridan | F16H 57/0421 |
| 10,801,443 | B2 * | 10/2020 | Kupratis | F01D 13/00 |
| 10,808,625 | B2 * | 10/2020 | Yoshitomi | F16H 57/0456 |
| 11,028,781 | B2 * | 6/2021 | Beck | F16H 57/08 |
| 11,041,562 | B2 * | 6/2021 | Lemoine | F16H 57/043 |
| 2015/0233301 | A1 * | 8/2015 | Sheridan | F02C 7/32 415/124.1 |
| 2018/0080411 | A1 | 3/2018 | Miller et al. | |
| 2018/0328289 | A1 * | 11/2018 | Madge | F02C 7/36 |
| 2021/0017910 | A1 * | 1/2021 | Spruce | F16H 1/06 |

FOREIGN PATENT DOCUMENTS

| | | |
|---|---|---|
| EP | 1777406 A2 | 4/2007 |
| EP | 2946103 A1 | 11/2015 |
| WO | 2014113372 A1 | 7/2014 |

OTHER PUBLICATIONS

Extended European Search Report, European Application No. 20180744. 3-1012, dated Nov. 6, 2020, 8 pages.

* cited by examiner

Primary Examiner — Terence Boes
(74) Attorney, Agent, or Firm — Barnes & Thornburg LLP

(57) ABSTRACT

A gas turbine engine includes an engine core, a fan and a gearbox interconnecting the engine core and the fan. The engine core is configured to drive rotation of at least one shaft. The power gearbox is configured to transfer torque from the at least one shaft to an output shaft at a reduced rate. The output shaft is coupled to the fan to drive the fan at the reduced rate and provide trust for the gas turbine engine.

20 Claims, 3 Drawing Sheets

TURBOFAN GAS TURBINE ENGINE WITH GEARBOX

FIELD OF THE DISCLOSURE

The present disclosure relates to gas turbine engines, particularly to gas turbine engines including gearboxes with rotating components. More particularly, the present disclosure relates to a epicyclic gearbox for a gas turbine engine.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Some gas turbine engines transfer rotational energy and torque from the turbine to the output shaft which, in turn, is used to drive a fan and provide thrust for the gas turbine engine. In some instances, the rotational energy may need to be reduced before being transferred to the fan such that the fan is rotated at a lower speed compared to the turbine. Accordingly, some gas turbine engines include a gearbox with a sufficient reduction ratio to transfer the rotational energy from the turbine to the output shaft and the fan so that the fan is rotated at a proper angular speed desired for the thrust provided by the gas turbine engine. Transferring rotational energy from the turbine to the output shaft using a gearbox may impart various loads on the gearbox or other areas of the gas turbine engine which could affect the durability and/or life of the gear box or other components in the gas turbine engine.

SUMMARY

The present disclosure may comprise one or more of the following features and combinations thereof.

A gas turbine engine includes an engine core, a fan, and a gearbox. The engine core includes a compressor, a combustor, and a turbine arranged along a reference axis and configured to drive rotation of a power shaft about the reference axis during operation of the gas turbine engine. The fan is driven in rotation about the reference axis by an output shaft. The gearbox interconnects the output shaft and the power shaft to transfer rotational energy from the turbine to the fan during operation of the gas turbine engine.

In some embodiments, the gearbox includes a sun gear, a plurality of compound gears, and a ring gear. The sun gear is coupled with the power shaft for rotation about the reference axis with the power shaft. The plurality of compound gears are coupled with the sun gear and spaced circumferentially around the reference axis from one another and each compound gear is driven in rotation by the sun gear about a compound-gear axis that is fixed in position relative to the reference axis. The ring gear is coupled with each of the compound gears and the output shaft to transfer the rotational energy from the plurality of compound gears to the output shaft to drive rotation of the fan.

In some embodiments, each compound gear includes a first-stage gear coupled with the sun gear, a second-stage gear spaced axially from the first-stage gear and coupled with the ring gear, and a compound-gear shaft interconnecting the first-stage gear and the second-stage gear to cause the first-stage gear and the second-stage gear to rotate together. The first-stage gear and the second-stage gears have diameters that are smaller than a diameter of the sun gear.

In some embodiments, the sun gear and the ring gear have a gear ratio within a range of about 3 to about 5 and the gearbox includes up to seven compound gears.

In some embodiments, a ratio of the diameter of the sun gear to the diameter of the ring gear is within a range of about 0.2 to about 0.6.

In some embodiments, the ratio of the diameter of the sun gear to the diameter of the ring gear is within a range of about 0.4 to about 0.6.

In some embodiments, the ratio of the diameter of the sun gear to the diameter of the ring gear is within a range of about 0.46 to about 0.53.

In some embodiments, the ratio of the diameter of the sun gear to the diameter of the ring gear is greater than 0.5.

In some embodiments, the ratio of the diameter of the sun gear to the diameter of the ring gear is within a range of about 0.23 to about 0.57.

In some embodiments, the ratio of the diameter of the sun gear to the diameter of the ring gear is within a range of about 0.25 to about 0.54.

In some embodiments, the sun gear and the ring gear have a gear ratio within a range of about 3 to about 4.5.

In some embodiments, the ratio of the diameter of the sun gear to the diameter of the ring gear is within a range of about 0.23 to about 0.53.

In some embodiments, the ratio of the diameter of the sun gear to the diameter of the ring gear is within a range of about 0.4 to about 0.6.

In some embodiments, the ratio of the diameter of the sun gear to the diameter of the ring gear is within a range of about 0.46 to about 0.53.

In some embodiments, the ratio of the diameter of the sun gear to the diameter of the ring gear is greater than 0.5.

In some embodiments, the sun gear and the ring gear have a gear ratio within a range of about 3.5 to about 4.

In some embodiments, the ratio of the diameter of the sun gear to the diameter of the ring gear is within a range of about 0.44 to about 0.55.

In some embodiments, the ratio of the diameter of the sun gear to the diameter of the ring gear is greater than 0.5.

In some embodiments, a ratio of the diameter of the first-stage gear to the diameter of the ring gear is within a range of about 0.3 to about 0.4.

In some embodiments, the ratio of the diameter of the first-stage gear to the diameter of the ring gear is within a range of about 0.32 to about 0.36.

In some embodiments, a ratio of the diameter of the first-stage gear to the diameter of the ring gear is within a range of about 0.1 to about 0.2.

In some embodiments, the ratio of the diameter of the first-stage gear to the diameter of the ring gear is within a range of about 0.14 to about 0.19.

These and other features of the present disclosure will become more apparent from the following description of the illustrative embodiments.

BRIEF DESCRIPTION OF THE DRAWINGS

The detailed description particularly refers to the accompanying figures in which.

DETAILED DESCRIPTION

Figure 1:
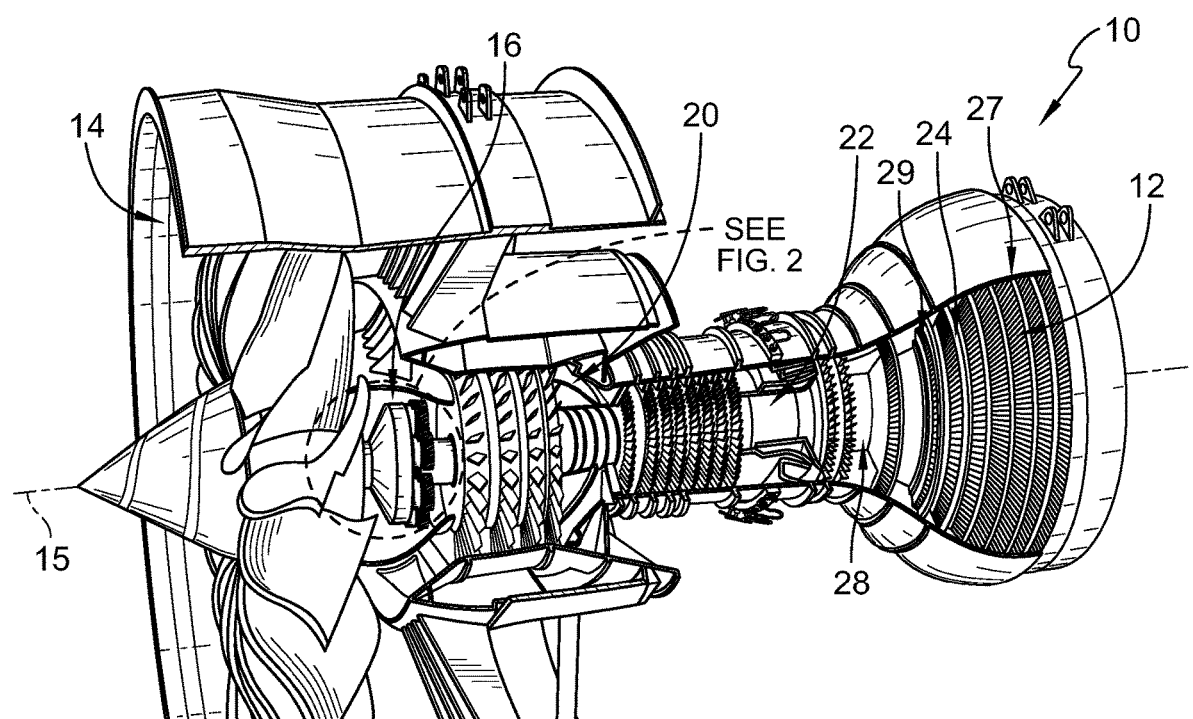
FIG. 1 is a perspective view of a gas turbine engine in accordance with the present disclosure with a portion of the gas turbine engine cut away to show that the gas turbine engine includes an engine core configured to drive a power shaft in rotation during operation of the gas turbine engine, a fan coupled to the engine core and configured to be driven by an output shaft to provide thrust for the gas turbine engine, and a gearbox interconnecting the power shaft and the output shaft to drive rotation of the output shaft and the fan at a reduced rotational speed relative to the power shaft.

For the purposes of promoting an understanding of the principles of the disclosure, reference will now be made to a number of illustrative embodiments illustrated in the drawings and specific language will be used to describe the same.

An illustrative gas turbine engine 10 is shown in FIG. 1 and is configured to provide thrust for a vehicle such as, for example, an aircraft. The gas turbine engine 10 includes an engine core 12, a fan 14 coupled with the engine core 12, and a gearbox 16 that is configured to transfer rotational energy from the engine core 12 to the fan 14. At least a portion of the engine core 12 is configured to rotate about an axis 15. The fan 14 is driven in rotation by the engine core 12 to provide thrust for the aircraft during operation of the gas turbine engine 10. The gearbox 16 is illustratively embodied as an epicyclic gearbox 16 that couples the engine core 12 to the fan 14 and is configured to cause a reduction in rotational speed from the engine core 12 to the fan 14 to increase efficiencies of the gas turbine engine 10.

The engine core 12 includes a compressor section 20, a combustor section 22, and a turbine section 24 as shown in FIG. 1. The fan 14 is coupled to the turbine section 24 via the gearbox 16 and provides thrust for propelling a vehicle such as, for example, an aircraft. The compressor section 20 compresses and delivers air to the combustor section 22. The combustor section 22 mixes fuel with the compressed air received from the compressor section 20 and ignites the fuel. The hot, high-pressure products of the combustion reaction in the combustor section 22 are directed into the turbine section 24 to cause the turbine section 24 to rotate about a central axis 15 and drive the compressor section 20 and the gearbox 16 (and, hence, the fan 14).

In the illustrative embodiment, the engine core 12 includes one or more shafts 26 coupled with the turbine section 24 to transfer rotational energy or torque from the turbine section 24 to the compressor section 20 and the gearbox 16. In one embodiment, the engine core 12 includes a low-pressure power shaft 26 coupled with a low-pressure turbine section 27 of the gas turbine engine 10 and the gearbox 16 and a high-pressure shaft 28 coupled with a high-pressure turbine section 29 of the gas turbine engine 10 and the compressor section 20. The low-pressure power shaft 26 is driven at a lower rotational speed compared to the high-pressure shaft 28 to provide varying rotational speeds for each section to which each shaft 26, 28 is coupled in order to increase efficiencies operating capabilities of the gas turbine engine 10. In other embodiments, additional shafts may be included to interconnect different sections of the engine core 12 and drive respective sections at varying rotational speeds.

Figure 2:
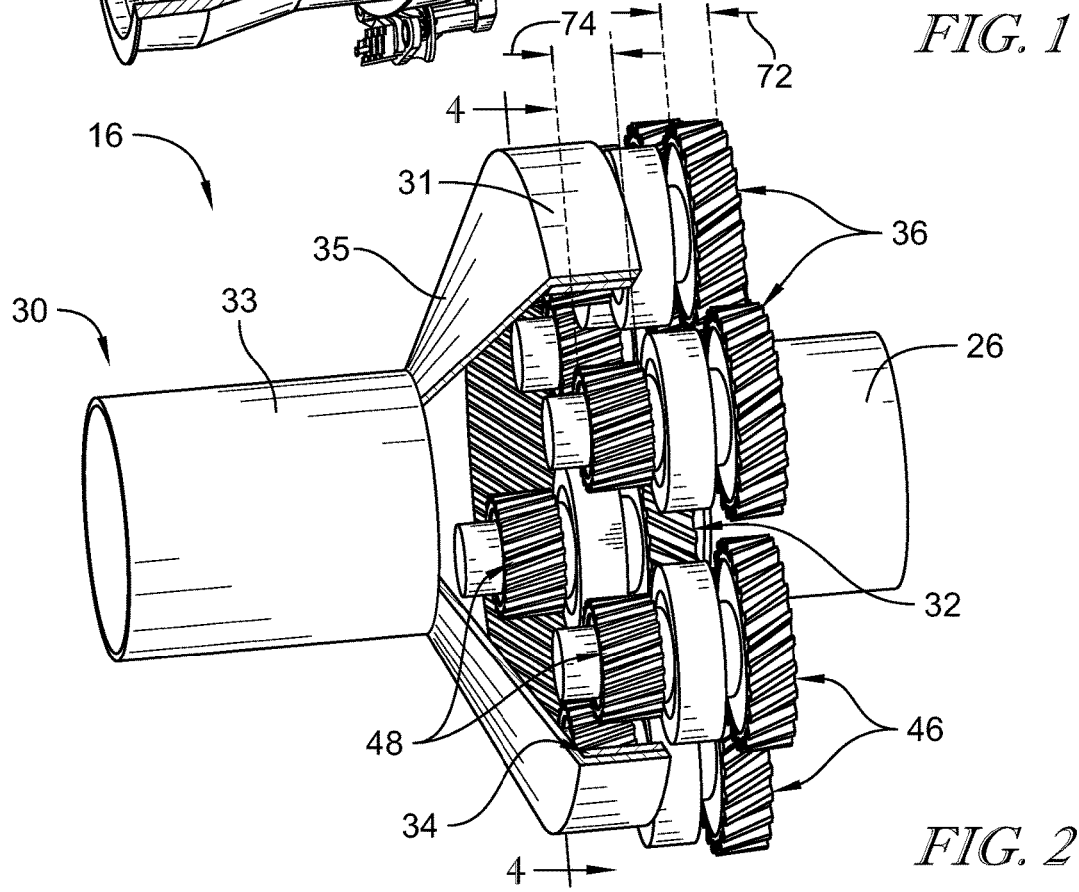
FIG. 2 is a perspective view of the gearbox from FIG. 1 with a portion of the gearbox cut away to show that the gearbox includes a sun gear coupled with the power shaft, a plurality of compound gears spaced circumferentially around the sun gear and driven in rotation by the sun gear, and a ring gear coupled to each compound gear and the output shaft to transfer rotational energy from the plurality of compound gears to the fan, and suggesting that the sun gear, the plurality of compound gears, and the ring gear are sized relative to one another to minimize misalignments between each gear interface.

The gearbox 16 is coupled to the power shaft 26 to receive torque from the turbine section 24 as shown in FIGS. 1 and 2. The gearbox 16 includes a sun gear 32, a ring gear 34, and a plurality of compound gears 36. The sun gear 32 is coupled with the power shaft 26 and is driven in rotation about the axis 25 by the power shaft 26 during operation of the gas turbine engine 10. The ring gear 36 is coupled with each of the compound gears 36 and is driven in rotation by each of the compound gears 36 such that the compound gears interconnect the sun gear 32 and the ring gear 34. The ring gear 34 is also coupled with an output shaft 30 that drives the fan 14. The plurality of compound gears 36 are spaced circumferentially around the sun gear 32 and are driven in rotation by the sun gear 32. The plurality of compound gears 36 interconnect the sun gear 32 and the ring gear to transfer torque from the power shaft to the such that the plurality of compound gears 36 drive the output shaft 30 and the fan 14 in rotation about the axis 25. In the illustrative embodiment, the power shaft 26 rotates at a common speed with the low-pressure turbine section 27. The gearbox 16 is configured to transfer increased torque from the power shaft 26 to the fan 14 through the output shaft 30 at a reduced rotational speed.

Figure 3:
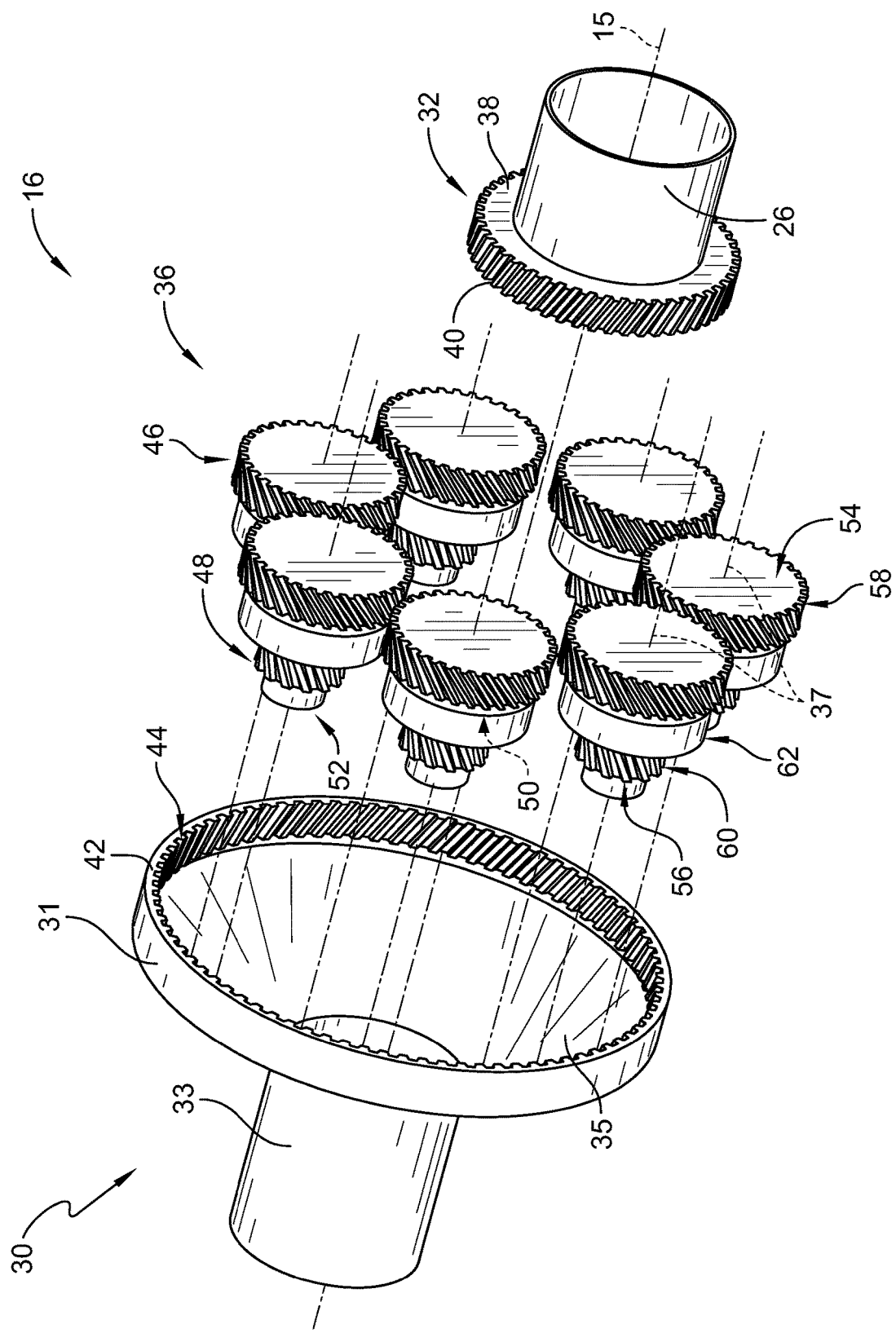
FIG. 3 is an exploded assembly view of the gearbox of FIGS. 1 and 2 with the sun gear coupled to the power shaft and the ring gear coupled to the output shaft and showing that each of the compound gears includes a first-stage gear that is configured to engage the sun gear and a second-stage gear spaced axially from the first-stage gear and configured to engage the ring gear.

The sun gear 32 is illustratively embodied as a helical gear and includes a gear body 38 and a plurality of gear teeth 40 extending outward from the gear body 38 as shown in FIG. 3. The gear body 38 is coupled directly to the power shaft 26. The plurality of teeth 40 are spaced apart from the power shaft 26 and extend radially outward from the gear body 38 into engagement with each compound gear 36. In other embodiments, the plurality of teeth 40 may be formed directly onto the power shaft 26 such that the gear body 38 is omitted.

The ring gear 34 is also embodied as a helical gear and includes a gear body 42 and a plurality of gear teeth 44 extending inwardly from the gear body 42 as shown in FIG. 3. The gear body 42 is coupled to output shaft 30. In the illustrative embodiment, the output shaft 30 includes a ring gear section 31 that has an increased diameter from a fan output section 33. A transition section 35 interconnects the ring gear section 31 with the fan output section 33. In other embodiments, the output shaft 30 may have a constant diameter. The plurality of teeth 44 are spaced apart from the ring gear section 31 of the output shaft 30 and extend radially inward from the gear body 42 and into engagement with each of the compound gears 36.

Each of the compound gears 36 includes a first-stage gear 46, a second-stage gear 48, a gear shaft 50, and a pinion 52 as shown in FIG. 3. Each of the first-stage gears 46 and second-stage gears 48 are illustratively embodied as helical gears with respective gear bodies 54, 56 and gear teeth 58, 60 coupled to the gear bodies 54, 56. The first-stage gear 46 is aligned axially with the sun gear 32 when the gearbox 16 is fully assembled. The plurality of gear teeth 40 of the sun gear 32 mesh with the plurality of gear teeth 58 of each first-stage gear 46. Each of the second-stage gears 48 are positioned axially forward from the first-stage gears 46 and aligned axially with the ring gear 34. The plurality of gear teeth 44 of the ring gear 34 mesh with the plurality of gear teeth of each second-stage gear 48. The gear shaft 50 interconnects the first-stage gear 46 and the second-stage gear 48 such that the first-stage gear 46 and the second-stage gear rotate at a common angular speed. The pinion 52 is disposed in a cavity 51 that extends axially through the first-stage gear 46, the second-stage gear 48, and the gear shaft 50 and is configured to support each compound gear 36 for rotation about individual axes 37 that are fixed circumferentially around the axis 15. Each compound gear 36 may further include one or more bearings 62 to help support each compound gear 36 and to reduce friction between various rotating components such as, for example, the gear shaft 50 and/or the pinion 52.

Each of the gears 32, 34, 36 included in the gearbox 16 is sized relative to one another to provide the rotational speed reduction described above and to minimize angular misalignments at interfaces between each gear where the gear teeth mesh with one another. Some gearboxes may include flexible (i.e. low stiffness) materials to account for angular misalignments so that loads are mitigated due to the angular misalignments. The gearbox 16 in the illustrative embodiment omits these flexible materials and addresses the angular misalignments by sizing each gear 32, 34, 36, as discussed below, so that they are less sensitive to angular misalignments at the interfaces between one another.

The gearbox 16 in the illustrative embodiment is a compound star gearbox that uses a sun gear 32 with a larger diameter compared to sun gears included in other epicyclic gearboxes. Using planetary gears with two stages also allows for an increased diameter of the sun gear 32. Additionally, the compound star gearbox in the illustrative embodiment includes a relatively large number of planet gears 36. In the illustrative embodiment, the gearbox 16 includes seven compound gears 36 spaced circumferentially around the axis 15, however, in other embodiments, any number of compound gears 36 may be used. Moreover, because the compound gears 36 are not rotating around axis 15, the compound gears 36 do not contribute any centrifugal forces. These aspects all contribute to decreasing a face width of each of the gears 32, 34, 36 which, in turn, minimizes gearbox sensitivity to angular misalignments.

Figure 4:
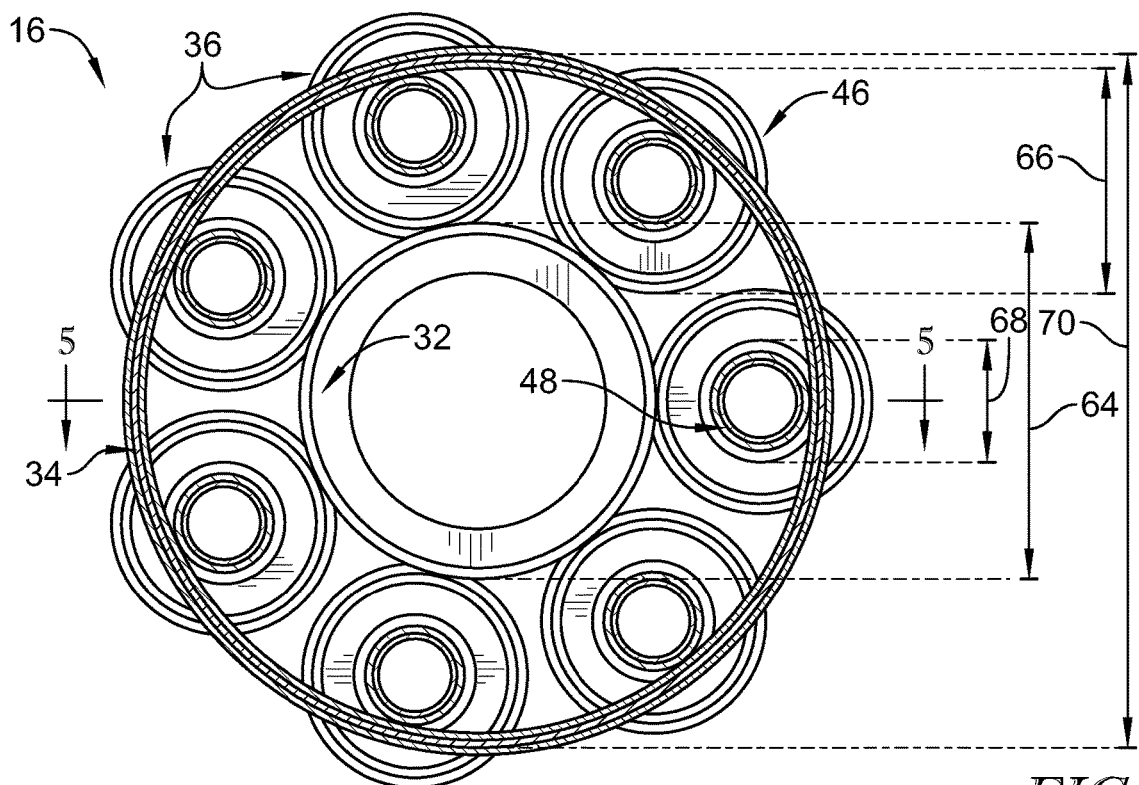
FIG. 4 is a sectional view of the gearbox taken along line 4-4 in FIG. 2 with dashed lines and arrows indicating a diameter of each of the gears relative to one another.

The sun gear 32 has a diameter 64 that is greater than a diameter 66 of each of the first-stage gears 46 and a diameter 68 of each of the second-stage gears 48 as shown in FIG. 4. The ring gear 34 has a diameter 70 that is larger than diameters 64, 66, 68 to reduce the rotational speed of the power shaft 26 transferred to the output shaft 30 and the fan 14. The sun gear 32 in the illustrative embodiment has a larger diameter 64 than other gearboxes when compared to the diameter 70 of the ring gear 34.

As shown below in Tables 1A-1C, the diameter 64 of the sun gear 32 may have a size that is relatively large in proportion to the diameter 70 of the ring gear 34. Tables 1A-1C contain values indicative of a ratio of the diameter 64 of the sun gear 32 to the diameter 70 of the ring gear 34 in terms of maximum limits and minimum limits for various gear ratios between 3 and 5.

Table 1A displays these ratios for a gearbox with a total of seven compound gears 36.

TABLE 1A

| Gear Ratio | Min Ratio Limit | Max Ratio Limit |
| --- | --- | --- |
| 3.0 | 0.42 | 0.58 |
| 3.5 | 0.44 | 0.57 |
| 4.0 | 0.46 | 0.55 |
| 4.5 | 0.47 | 0.53 |
| 5.0 | 0.48 | 0.51 |

Table 1B displays these ratios for a gearbox with a total of five compound gears 36.

TABLE 1B

| Gear Ratio | Min Ratio Limit | Max Ratio Limit |
| --- | --- | --- |
| 3.0 | 0.23 | 0.57 |
| 3.5 | 0.25 | 0.55 |
| 4.0 | 0.27 | 0.54 |
| 4.5 | 0.28 | 0.52 |
| 5.0 | 0.30 | 0.51 |

Table 1C displays these ratios for a gearbox with a total of three compound gears 36

TABLE 1C

| Gear Ratio | Min Ratio Limit | Max Ratio Limit |
| --- | --- | --- |
| 3.0 | 0.24 | 0.55 |
| 3.5 | 0.25 | 0.56 |
| 4.0 | 0.25 | 0.53 |
| 4.5 | 0.26 | 0.52 |
| 5.0 | 0.28 | 0.50 |

In one embodiment, the sun gear and the ring gear have a gear ratio within a range of about 3 to about 5. In another embodiment, the sun gear 32 and the ring gear 34 have a gear ratio within a range of about 3 to about 4.5. In yet another embodiment, the sun gear 32 and the ring gear 34 have a gear ratio within a range of about 3.5 to about 4.

In some embodiments, the gearbox 16 includes up to seven, or more, compound gears and the ratio of the diameter 64 of the sun gear 32 to the diameter 70 of the ring gear 34 is within a range of about 0.2 to about 0.6. In another embodiment, the ratio of the diameter 64 of the sun gear 32 to the diameter 70 of the ring gear 34 is within a range of about 0.4 to about 0.6. In another embodiment, the ratio of the diameter 64 of the sun gear 32 to the diameter 70 of the ring gear 34 is within a range of about 0.46 to about 0.53. In another embodiment, the ratio of the diameter 64 of the sun gear 32 to the diameter 70 of the ring gear 34 is within a range of about 0.44 to about 0.55. In another embodiment, the ratio of the diameter 64 of the sun gear 32 to the diameter 70 of the ring gear 34 is greater than 0.5. In another embodiment, the ratio of the diameter 64 of the sun gear 32 to the diameter 70 of the ring gear 34 is within a range of about 0.23 to about 0.57. In another embodiment, the ratio of the diameter 64 of the sun gear 32 to the diameter 70 of the ring gear 34 is within a range of about 0.25 to about 0.54. In another embodiment, the ratio of the diameter 64 of the sun gear 32 to the diameter 70 of the ring gear 34 is within a range of about 0.23 to about 0.53.

In one embodiment, a ratio of the diameter of the first-stage gear 46 to the diameter of the ring gear 34 is within a range of about 0.25 to about 0.4. In another embodiment, the ratio of the diameter of the first-stage gear 46 to the diameter of the ring gear 34 is within a range of about 0.29 to about 0.38. In another embodiment, the ratio of the diameter of the first-stage gear 46 to the diameter of the ring gear 34 is within a range of about 0.32 to about 0.36.

In one embodiment, a ratio of the diameter of the second-stage gear 48 to the diameter of the ring gear 34 is within a range of about 0.1 to about 0.3. In another embodiment, the ratio of the diameter of the second-stage gear 48 to the diameter of the ring gear 34 is within a range of about 0.13 to about 0.23. In another embodiment, the ratio of the diameter of the second-stage gear 48 to the diameter of the ring gear 34 is within a range of about 0.14 to about 0.19.

In one embodiment, a ratio of the diameter of the first-stage gear 46 to the diameter of the second-stage gear 48 is within a range of about 1 to about 3. In another embodiment, the ratio of the diameter of the first-stage gear 46 to the diameter of the second-stage gear 48 is within a range of about 1.5 to about 2.5. In another embodiment, the ratio of the diameter of the first-stage gear 46 to the diameter of the second-stage gear 48 is within a range of about 1.7 to about 2.1.

Figure 5:
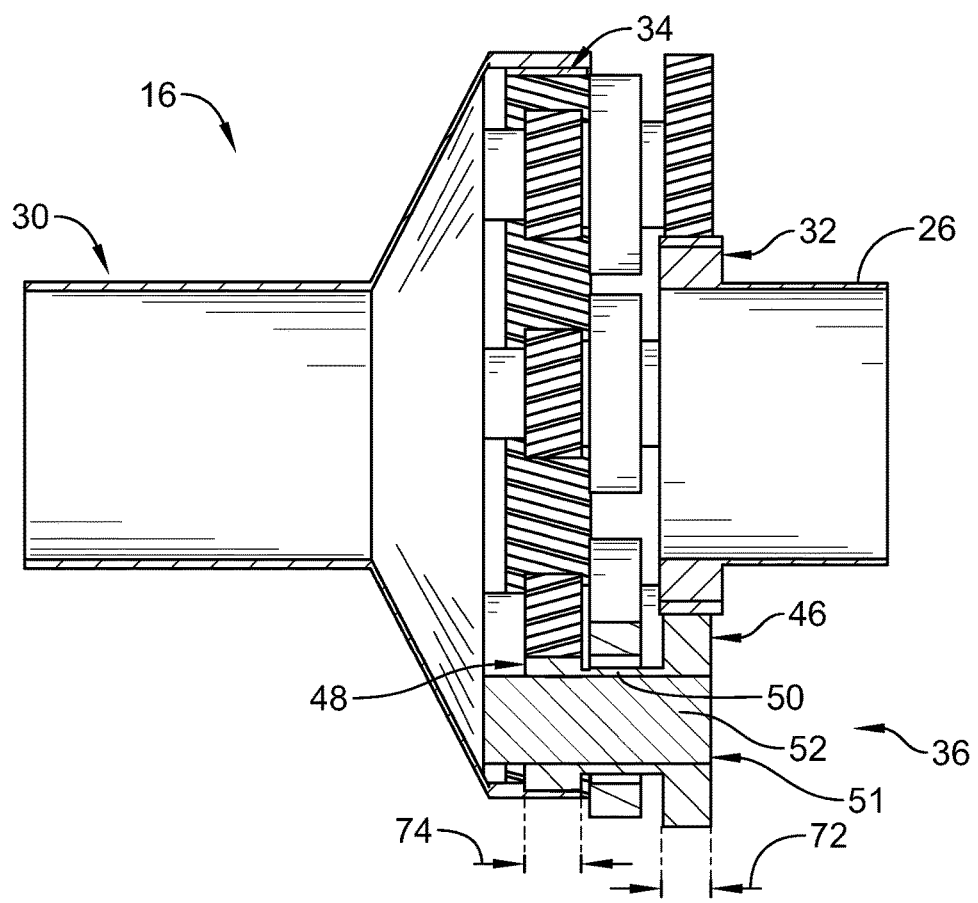
FIG. 5 is a sectional view of the gearbox taken along line 5-5 in FIG. 4 through a center of one of the compound gears showing the first stage gear engaged with the sun gear and the second stage gear engaged with the ring gear to transfer rotational energy from the power shaft to the output shaft at a reduced rate and showing dashed lines and arrows indicating face widths of the first-stage gear and the second-stage gear.

By increasing the diameter 64 of the sun gear 32 as compared to the diameters 66, 68, 70 of the first-stage gears 46, the second-stage gears 48, and the ring gear 34, respectively, the face widths of each of the first-stage gears 46 and the second-stage gears 48 may be minimized to reduce angular misalignments and, hence, loads on the gearbox 16. The first-stage gear 46 has a first face width 72 and the second-stage gear 48 has a second face width 74 as shown in FIG. 5. The face widths 72, 74 may be normalized or compared with other features of the gas turbine engine 10 and/or the gearbox 16. The tables below contain ratios and values that are indicative of a gearbox 16 with compound gear face widths 72, 74 that reduce external angular misalignments. The values and ratios shown in the tables include: (i) face width numerical limits, (ii) face width-to-gear diameter (L/D), (iii) face width-to-fan power (mm/MW), (iv) face width-to-gearbox input torque (mm/kNm), (v) face width-to-stage input torque per planet (mm/kNm), (vi) face width-to-pinion gear diameter (mm/mm), (vii) face width-to-inverted tooth number (mm.tooth), (viii), and face width-to-fan diameter (mm/mm).

The values described above and shown below in each table may change depending on the size of the gas turbine engine and/or the architecture of the gearbox. Example 1 and Example 2 represent two non-limiting illustrative gearbox architectures that may be used in a small sized gas turbine engine, such as a gas turbine engine with a fan diameter of up to about 150 cm, a medium sized gas turbine engine, such as a gas turbine engine with a fan diameter within a range of about 150 cm to about 250 cm, and a large sized gas turbine engine, such as a gas turbine engine with a fan diameter of greater than about 250 cm.

EXAMPLE 1

Tables 2 and 3 contain upper limits of values and/or ratios of the first-stage gear 46 and the second-stage gear, respectively, for the first example.

TABLE 2

Example 1: First-Stage Gear Upper Limits

| Value/Ratio | Dimension | Small Engine | Medium Engine | Large Engine |
|---|---|---|---|---|
| Face width numerical limit | mm | 28.6 | 31.5 | 40 |
| Face width-to-gear diameter (L/D) ratio | mm/mm | 0.118 | 0.095 | 0.101 |
| Face width-to-fan power ratio | mm/MW | 1.40 | 1.14 | 0.71 |
| Face width-to-gearbox input torque ratio | mm/kNm | 1.42 | 0.99 | 0.48 |
| Face width-to-stage input torque per planet ratio | mm/kNm | 9.97 | 6.92 | 3.38 |
| Face width-to-pinion gear diameter ratio | mm/mm | 0.17 | 0.16 | 0.14 |
| Face width-to-inverted tooth number ratio | mm.tooth | 1544 | 2363 | 3560 |
| Face width-to-fan diameter ratio | mm/mm | 0.0134 | 0.0119 | 0.0114 |

TABLE 3

Example 1: Second-Stage Gear Upper Limits

| Value/Ratio | Dimension | Small Engine | Medium Engine | Large Engine |
|---|---|---|---|---|
| Face width numerical limit | mm | 39.4 | 43.3 | 55 |
| Face width-to-gear diameter (L/D) ratio | mm/mm | 0.077 | 0.069 | 0.065 |
| Face width-to-fan power ratio | mm/MW | 1.93 | 1.57 | 0.97 |
| Face width-to-gearbox input torque ratio | mm/kNm | 1.96 | 1.36 | 0.66 |
| Face width-to-stage input torque per planet ratio | mm/kNm | 20.05 | 16.22 | 6.37 |
| Face width-to-pinion gear diameter ratio | mm/mm | 0.38 | 0.44 | 0.33 |
| Face width-to-inverted tooth number ratio | mm.tooth | 4492 | 6105 | 10505 |
| Face width-to-fan diameter ratio | mm/mm | 0.0185 | 0.0164 | 0.0157 |

Tables 4 and 5 contain lower limits of values and/or ratios of the first-stage gear 46 and the second-stage gear 48, respectively, for the first example.

TABLE 4

Example 1: First-Stage Gear Lower Limits

| Value/Ratio | Dimension | Small Engine | Medium Engine | Large Engine |
|---|---|---|---|---|
| Face width numerical limit | mm | 7.1 | 7.8 | 10 |
| Face width-to-gear diameter (L/D) ratio | mm/mm | 0.029 | 0.023 | 0.025 |
| Face width-to-fan power ratio | mm/MW | 0.35 | 0.28 | 0.18 |
| Face width-to-gearbox input torque ratio | mm/kNm | 0.35 | 0.24 | 0.12 |
| Face width-to-stage input torque per planet ratio | mm/kNm | 2.48 | 1.71 | 0.85 |
| Face width-to-pinion gear diameter ratio | mm/mm | 0.04 | 0.04 | 0.03 |
| Face width-to-inverted tooth number ratio | mm.tooth | 383 | 585 | 890 |
| Face width-to-fan diameter ratio | mm/mm | 0.0033 | 0.0030 | 0.0029 |

TABLE 5

Example 1: Second-Stage Gear Lower Limits

| Value/Ratio | Dimension | Small Engine | Medium Engine | Large Engine |
|---|---|---|---|---|
| Face width numerical limit | mm | 10.7 | 11.8 | 15 |
| Face width-to-gear diameter (L/D) ratio | mm/mm | 0.021 | 0.019 | 0.018 |
| Face width-to-fan power ratio | mm/MW | 0.52 | 0.43 | 0.26 |
| Face width-to-gearbox input torque ratio | mm/kNm | 0.53 | 0.37 | 0.18 |
| Face width-to-stage input torque per planet ratio | mm/kNm | 5.44 | 4.42 | 1.74 |
| Face width-to-pinion gear diameter ratio | mm/mm | 0.10 | 0.12 | 0.09 |
| Face width-to-inverted tooth number ratio | mm·tooth | 1220 | 1664 | 2865 |
| Face width-to-fan diameter ratio | mm/mm | 0.0050 | 0.0045 | 0.0043 |

EXAMPLE 2

Tables 6 and 7 contain upper limits of values and/or ratios of the first-stage gear 46 and the second-stage gear 48, respectively, for the second example.

TABLE 6

Example 2: First-Stage Gear Upper Limits

| Value/Ratio | Dimension | Small Engine | Medium Engine | Large Engine |
|---|---|---|---|---|
| Face width numerical limit | mm | 28.6 | 31.5 | 40 |
| Face width-to-gear diameter (L/D) ratio | mm/mm | 0.099 | 0.109 | 0.089 |
| Face width-to-fan power ratio | mm/MW | 1.40 | 1.14 | 0.71 |
| Face width-to-gearbox input torque ratio | mm/kNm | 1.44 | 0.98 | 0.47 |
| Face width-to-stage input torque per planet ratio | mm/kNm | 10.08 | 6.85 | 3.30 |
| Face width-to-pinion gear diameter ratio | mm/mm | 0.20 | 0.15 | 0.15 |
| Face width-to-inverted tooth number ratio | mm·tooth | 1859 | 2048 | 4080 |
| Face width-to-fan diameter ratio | mm/mm | 0.0134 | 0.0119 | 0.0114 |

TABLE 7

Example 2: Second-Stage Gear Upper Limits

| Value/Ratio | Dimension | Small Engine | Medium Engine | Large Engine |
|---|---|---|---|---|
| Face width numerical limit | mm | 39.4 | 43.3 | 55 |
| Face width-to-gear diameter (L/D) ratio | mm/mm | 0.077 | 0.070 | 0.065 |
| Face width-to-fan power ratio | mm/MW | 1.93 | 1.57 | 0.97 |
| Face width-to-gearbox input torque ratio | mm/kNm | 1.98 | 1.35 | 0.65 |
| Face width-to-stage input torque per planet ratio | mm/kNm | 27.36 | 13.03 | 7.85 |
| Face width-to-pinion gear diameter ratio | mm/mm | 0.52 | 0.36 | 0.41 |
| Face width-to-inverted tooth number ratio | mm·tooth | 4531 | 6019 | 10505 |
| Face width-to-fan diameter ratio | mm/mm | 0.0185 | 0.0164 | 0.0157 |

Tables 8 and 9 contain lower limits of values and/or ratios of the first-stage gear 46 and the second-stage gear 48, respectively, for the second example.

TABLE 8

Example 2: First-Stage Gear Lower Limits

| Value/Ratio | Dimension | Small Engine | Medium Engine | Large Engine |
|---|---|---|---|---|
| Face width numerical limit | mm | 7.1 | 7.8 | 10 |
| Face width-to-gear diameter (L/D) ratio | mm/mm | 0.025 | 0.027 | 0.022 |
| Face width-to-fan power ratio | mm/MW | 0.35 | 0.28 | 0.18 |
| Face width-to-gearbox input torque ratio | mm/kNm | 0.36 | 0.24 | 0.12 |
| Face width-to-stage input torque per planet ratio | mm/kNm | 2.50 | 1.70 | 0.83 |
| Face width-to-pinion gear diameter ratio | mm/mm | 0.05 | 0.04 | 0.04 |
| Face width-to-inverted tooth number ratio | mm·tooth | 462 | 507 | 1020 |
| Face width-to-fan diameter ratio | mm/mm | 0.0033 | 0.0030 | 0.0029 |

TABLE 9

Example 2: Second-Stage Gear Lower Limits

| Value/Ratio | Dimension | Small Engine | Medium Engine | Large Engine |
|---|---|---|---|---|
| Face width numerical limit | mm | 10.7 | 11.8 | 15 |
| Face width-to-gear diameter (L/D) ratio | mm/mm | 0.021 | 0.019 | 0.018 |
| Face width-to-fan power ratio | mm/MW | 0.52 | 0.43 | 0.26 |
| Face width-to-gearbox input torque ratio | mm/kNm | 0.54 | 0.37 | 0.18 |
| Face width-to-stage input torque per planet ratio | mm/kNm | 7.43 | 3.55 | 2.14 |
| Face width-to-pinion gear diameter ratio | mm/mm | 0.14 | 0.10 | 0.11 |
| Face width-to-inverted tooth number ratio | mm·tooth | 1231 | 1640 | 2865 |
| Face width-to-fan diameter ratio | mm/mm | 0.0050 | 0.0045 | 0.0043 |

Additional examples of gearboxes with various values and/or ratios that minimize the face widths 72, 74 are described below.

In one embodiment, the first-stage gear 46 has a face width 72 of up to about 40 mm while the second-stage gear 48 has a face width 74 of up to about 55 mm. In another embodiment, the first-stage gear 46 has a face width 72 within a range of about 10 mm to about 40 mm while the second-stage gear 48 has a face width 74 within a range of about 15 mm to about 55 mm.

In another embodiment, the first-stage gear 46 has a face width-to-diameter ratio of up to about 0.12 while the second-stage gear 48 has a face width-to-diameter ratio of up to about 0.08. In another embodiment, the first-stage gear has a face width-to-diameter ratio within a range of about 0.02 to about 0.12 while the second-stage gear 48 has a face width-to-diameter ratio of within a range of about 0.015 to about 0.08.

In another embodiment, the first-stage gear 46 has a face width-to-fan power ratio of up to about 0.8 mm/MW while the second-stage gear 48 has a face width-to-fan power ratio of up to about 1.1 mm/MW. In another embodiment, the first-stage gear 46 has a face width-to-fan power ratio of up to about 0.76 mm/MW while the second-stage gear 48 has a face width-to-fan power ratio of up to about 1.06 mm/MW.

In another embodiment, the first-stage gear 46 has a face width-to-gearbox input torque ratio of up to about 0.5 mm/kNm while the second-stage gear 48 has a face width-to-gearbox input torque ratio of up to about 1 mm/kNm. In another embodiment, the first-stage gear 46 has a face width-to-gearbox input torque ratio of up to about 0.51 mm/kNm while the second-stage gear 48 has a face width-to-gearbox input torque ratio of up to about 0.70 mm/kNm.

In another embodiment, the first-stage gear 46 has a face width-to-stage input torque ratio of up to about 0.5 mm/kNm while the second-stage gear 48 has a face width-to-stage input torque ratio of up to about 0.01 mm/kNm. In another embodiment, the first-stage gear 46 has a face width-to-stage input torque ratio of up to about 0.51 mm/kNm while the second-stage gear 48 has a face width-to-stage input torque ratio of up to about 0.0065 mm/kNm.

In another embodiment, the first-stage gear has a face width-to-pinion gear diameter ratio of up to about 0.2 and the second-stage gear has a face width-to-pinion gear diameter ratio of up to about 0.6. In another embodiment, the first-stage gear has a face width-to-inverted tooth number ratio of up to about 4100 and the second-stage gear has a face width-to-inverted tooth number ratio of up to about 10,500.

In another embodiment, the first stage gear has a face width-to-fan diameter ratio of up to about 0.014 and the second-stage gear has a face width-to-fan diameter ratio of up to about 0.02. In another embodiment, the first-stage gear has a face width-to-fan diameter ratio within a range of about 0.002 to about 0.014 and the second-stage gear has a face width-to-fan diameter ratio within a range of about 0.004 to about 0.02.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, or 5. The gear ratio may be, for example, between any two of the values in the previous sentence. Purely by way of example, the gearbox may be a "star" gearbox having one of the gear ratios described above. In some arrangements, the gear ratio may be outside these ranges.

The radius of the fan may be measured between the engine centerline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches), 420 cm (around 165 inches), or greater than 420 cm. The fan diameter may be in an inclusive range bounded by any two of the values in the previous sentence (i.e. the values may form upper or lower bounds), for example in the range of from about 240 cm to about 280 cm or about 330 cm to about 380 cm.

The rotational speed of the fan may vary in use. Generally, the rotational speed is lower for fans with a higher diameter. Purely by way of non-limitative example, the rotational speed of the fan at cruise conditions may be less than about 2500 rpm, for example less than about 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In some embodiments, angular mis-alignments within gearboxes may contribute to an increase in loading in both the gears and bearing components. Some gas turbine engines may introduce lateral and angular flexibility (low stiffness) into various parts of the gearbox to compensate for this issue. The present disclosure may change the configuration of the gearbox away from the single stage designs, and use low face width gears which are better at operating with or minimizing angular mis-alignments. The present disclosure uses a compound epicyclic gearbox which achieves the overall gear ratio desired using two stages. This allows the inclusion of larger diameter gears, and hence, much smaller face widths.

In some embodiments, a gas turbine engine for an aircraft includes: an engine core comprising a turbine, a compressor, and a core shaft connecting the turbine to the compressor; a fan located upstream of the engine core, the fan comprising a plurality of fan blades; a gearbox that receives an input from the core shaft and outputs drive to the fan so as to drive the fan at a lower rotational speed than the core shaft; and wherein the gearbox is a compound epicyclic gearbox the gearbox having two stages, the first stage having a tooth face width in the range of the face width numerical limits shown in Tables 4 and/or 8 to the face width numerical limits shown in Tables 2 and/or 6, the second stage having a tooth face width in the range of the face width numerical limits shown in Tables 5 and/or 9 to the face width numerical limits shown in Tables 3 and/or 7.

In some embodiments, mis-alignment is an angular quantity generally expressed in milli-radians which is equivalent to thou per inch. The total range of gear teeth movement (deeper and shallower into the mesh) may be this angular misalignment multiplied by the face width. Narrower face widths are sometimes less sensitive to misalignment. In some embodiments, compound gearboxes may include an increased number of compound planets (7) compared to single stage designs (5 planets) and the "Big Sun" proportions. In some embodiments, face widths are less for a Double Helical DP1A comparable gearbox (GBX) diameter of about 800 mm.

In some embodiments, the input central sun gear is a much larger proportion of the output ring gear than other gearboxes. In some embodiments, there is a higher number of planet gears, for example, seven. In some embodiments, the planet gear teeth which mesh with the sun gear are distinct from those which mesh with the ring gear. In some embodiments, the planet gears do not orbit around the engine centerline, and hence do not create centrifugal loads. These four aspects may allow a larger sun gear size and hence a lower gear face width.

In some embodiments, higher gearbox diameters are enabled by using the compound star configuration giving no rotational contribution to the bearing load and face widths can be dropped to about 40 mm. In some embodiments, compound gearboxes may be able to cope with externally (engine in this case) generated mis-alignments without having a commonly used flexible member (either input shaft, ring gear, or carrier mounting).

In some embodiments, an upper limit of each face width is around about 33% of other comparative designs. For example, compared to the upper limit, a comparative gearbox may have a face width of around about 100 mm, about 120 mm, and about 150 mm at small, medium, and large engine sizes. In some embodiments, lower limits may be based on the ultimate capacity of the gear teeth of each gear—this may be around about 25% of the upper limit. In other words, this may be the largest load that can be transmitted by any gear even assuming perfect alignment conditions.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The following numbered clauses include embodiments that are contemplated and non-limiting:

Clause 1. A gas turbine engine comprising
an engine core including, a compressor, a combustor, and a turbine arranged along a reference axis, the turbine configured to drive rotation of a power shaft about the reference axis during operation of the gas turbine engine,
a fan driven in rotation about the reference axis by an output shaft, and
a gearbox interconnecting the output shaft and the power shaft to transfer rotational energy from the turbine to the fan during operation of the gas turbine engine, the gearbox including (i) a sun gear coupled with the power shaft for rotation about the reference axis with the power shaft, (ii) a plurality of compound gears coupled with the sun gear and spaced circumferentially around the reference axis from one another, each compound gear driven in rotation by the sun gear about a compound-gear axis that is fixed in position relative to the reference axis, and (iii) a ring gear coupled with each of the compound gears and the output shaft to transfer the rotational energy from the plurality of compound gears to the output shaft to drive rotation of the fan,
wherein each compound gear includes a first-stage gear coupled with the sun gear, a second-stage gear spaced axially from the first-stage gear and coupled with the ring gear, and a compound-gear shaft interconnecting the first-stage gear and the second-stage gear to cause the first-stage gear and the second-stage gear to rotate together, the first-stage gear and the second-stage gears having diameters that are smaller than a diameter of the sun gear.

Clause 2. The gas turbine engine of clause 1 or any other suitable clause or combination of clauses, wherein the sun gear and the ring gear have a gear ratio within a range of about 3 to about 5 and the gearbox includes up to seven compound gears.

Clause 3. The gas turbine engine of clause 2 or any other suitable clause or combination of clauses, wherein a ratio of the diameter of the sun gear to the diameter of the ring gear is within a range of about 0.2 to about 0.6.

Clause 4. The gas turbine engine of clause 3 or any other suitable clause or combination of clauses, wherein the ratio of the diameter of the sun gear to the diameter of the ring gear is within a range of about 0.4 to about 0.6.

Clause 5. The gas turbine engine of clause 4 or any other suitable clause or combination of clauses, wherein the ratio of the diameter of the sun gear to the diameter of the ring gear is within a range of about 0.46 to about 0.53.

Clause 6. The gas turbine engine of clause 5 or any other suitable clause or combination of clauses, wherein the ratio of the diameter of the sun gear to the diameter of the ring gear is greater than 0.5.

Clause 7. The gas turbine engine of clause 3 or any other suitable clause or combination of clauses, wherein the ratio of the diameter of the sun gear to the diameter of the ring gear is within a range of about 0.23 to about 0.57.

Clause 8. The gas turbine engine of clause 4 or any other suitable clause or combination of clauses, wherein the ratio of the diameter of the sun gear to the diameter of the ring gear is within a range of about 0.25 to about 0.54.

Clause 9. The gas turbine engine of clause 2 or any other suitable clause or combination of clauses, wherein the sun gear and the ring gear have a gear ratio within a range of about 3 to about 4.5.

Clause 10. The gas turbine engine of clause 5 or any other suitable clause or combination of clauses, wherein the ratio of the diameter of the sun gear to the diameter of the ring gear is within a range of about 0.23 to about 0.53.

Clause 11. The gas turbine engine of clause 10 or any other suitable clause or combination of clauses, wherein the ratio of the diameter of the sun gear to the diameter of the ring gear is within a range of about 0.4 to about 0.6.

Clause 12. The gas turbine engine of clause 11 or any other suitable clause or combination of clauses, wherein the ratio of the diameter of the sun gear to the diameter of the ring gear is within a range of about 0.46 to about 0.53.

Clause 13. The gas turbine engine of clause 12 or any other suitable clause or combination of clauses, wherein the ratio of the diameter of the sun gear to the diameter of the ring gear is greater than 0.5.

Clause 14. The gas turbine engine of clause 2 or any other suitable clause or combination of clauses, wherein the sun gear and the ring gear have a gear ratio within a range of about 3.5 to about 4.

Clause 15. The gas turbine engine of clause 14 or any other suitable clause or combination of clauses, wherein the ratio of the diameter of the sun gear to the diameter of the ring gear is within a range of about 0.44 to about 0.55.

Clause 16. The gas turbine engine of clause 15 or any other suitable clause or combination of clauses, wherein the ratio of the diameter of the sun gear to the diameter of the ring gear is greater than 0.5.

Clause 17. The gas turbine engine of clause 1 or any other suitable clause or combination of clauses, wherein a ratio of the diameter of the first-stage gear to the diameter of the ring gear is within a range of about 0.3 to about 0.4.

Clause 18. The gas turbine engine of clause 17 or any other suitable clause or combination of clauses, wherein the ratio of the diameter of the first-stage gear to the diameter of the ring gear is within a range of about 0.32 to about 0.36.

Clause 19. The gas turbine engine of clause 1 or any other suitable clause or combination of clauses, wherein a ratio of the diameter of the first-stage gear to the diameter of the ring gear is within a range of about 0.1 to about 0.2.

Clause 20. The gas turbine engine of clause 19 or any other suitable clause or combination of clauses, wherein the ratio of the diameter of the first-stage gear to the diameter of the ring gear is within a range of about 0.14 to about 0.19.

Clause 21. The gas turbine engine of clause 1 or any other suitable clause or combination of clauses, wherein the gearbox is an epicyclic gearbox.

Clause 22. The gas turbine engine of clause 21 or any other suitable clause or combination of clauses, wherein the gearbox is a star gearbox.

Clause 23. The gas turbine engine of clause 22 or any other suitable clause or combination of clauses, wherein the gearbox is a compound star gearbox.

Clause 24. The gas turbine engine of clause 21 or any other suitable clause or combination of clauses, wherein the gearbox is a planetary gearbox.

What is claimed is:

1. A gas turbine engine comprising
an engine core including, a compressor, a combustor, and a turbine arranged along a reference axis, the turbine configured to drive rotation of a power shaft about the reference axis during operation of the gas turbine engine,
a fan driven in rotation about the reference axis by an output shaft, and
a gearbox interconnecting the output shaft and the power shaft to transfer rotational energy from the turbine to the fan during operation of the gas turbine engine, the gearbox including (i) a sun gear coupled with the power shaft for rotation about the reference axis with the power shaft, (ii) a plurality of compound gears coupled with the sun gear and spaced circumferentially around the reference axis from one another, each compound gear driven in rotation by the sun gear about a compound-gear axis that is fixed in position relative to the reference axis, and (iii) a ring gear coupled with each of the compound gears and the output shaft to transfer the rotational energy from the plurality of compound gears to the output shaft to drive rotation of the fan,
wherein each compound gear includes a first-stage gear coupled with the sun gear, a second-stage gear spaced axially from the first-stage gear and coupled with the ring gear, and a compound-gear shaft interconnecting the first-stage gear and the second-stage gear to cause the first-stage gear and the second-stage gear to rotate together, and the first-stage gear and the second-stage gears each having diameters that are smaller than a diameter of the sun gear,
wherein the gearbox includes seven or more compound gears, and
wherein the first-stage gear has a face width of up to 40 mm and the second-stage gear has a face width of up to 55 mm.

2. The gas turbine engine of claim 1, wherein the sun gear and the ring gear have a gear ratio within a range of about 3 to about 5 and the gearbox includes up to seven compound gears.

3. The gas turbine engine of claim 2, wherein a ratio of the diameter of the sun gear to the diameter of the ring gear is within a range of about 0.2 to about 0.6.

4. The gas turbine engine of claim 3, wherein the ratio of the diameter of the sun gear to the diameter of the ring gear is within a range of about 0.4 to about 0.6.

5. The gas turbine engine of claim 4, wherein the ratio of the diameter of the sun gear to the diameter of the ring gear is within a range of about 0.46 to about 0.53.

6. The gas turbine engine of claim 5, wherein the ratio of the diameter of the sun gear to the diameter of the ring gear is greater than 0.5.

7. The gas turbine engine of claim 3, wherein the ratio of the diameter of the sun gear to the diameter of the ring gear is within a range of about 0.23 to about 0.57.

8. The gas turbine engine of claim 4, wherein the ratio of the diameter of the sun gear to the diameter of the ring gear is within a range of about 0.25 to about 0.54.

9. The gas turbine engine of claim 2, wherein the sun gear and the ring gear have a gear ratio within a range of about 3 to about 4.5.

10. The gas turbine engine of claim 5, wherein the ratio of the diameter of the sun gear to the diameter of the ring gear is within a range of about 0.23 to about 0.53.

11. The gas turbine engine of claim 10, wherein the ratio of the diameter of the sun gear to the diameter of the ring gear is within a range of about 0.4 to about 0.6.

12. The gas turbine engine of claim 11, wherein the ratio of the diameter of the sun gear to the diameter of the ring gear is within a range of about 0.46 to about 0.53.

13. The gas turbine engine of claim 12, wherein the ratio of the diameter of the sun gear to the diameter of the ring gear is greater than 0.5.

14. The gas turbine engine of claim 2, wherein the sun gear and the ring gear have a gear ratio within a range of about 3.5 to about 4.

15. The gas turbine engine of claim 14, wherein the ratio of the diameter of the sun gear to the diameter of the ring gear is within a range of about 0.44 to about 0.55.

16. The gas turbine engine of claim 15, wherein the ratio of the diameter of the sun gear to the diameter of the ring gear is greater than 0.5.

17. The gas turbine engine of claim 1, wherein a ratio of the diameter of the first-stage gear to the diameter of the ring gear is within a range of about 0.3 to about 0.4.

18. The gas turbine engine of claim 17, wherein the ratio of the diameter of the first-stage gear to the diameter of the ring gear is within a range of about 0.32 to about 0.36.

19. The gas turbine engine of claim 1, wherein a ratio of the diameter of the first-stage gear to the diameter of the ring gear is within a range of about 0.1 to about 0.2.

20. The gas turbine engine of claim 19, wherein the ratio of the diameter of the first-stage gear to the diameter of the ring gear is within a range of about 0.14 to about 0.19.

* * * * *